J. H. HERTNER.
DRIVING MECHANISM FOR AUTOMOBILES.
APPLICATION FILED MAR. 20, 1913.

1,173,350.

Patented Feb. 29, 1916.
2 SHEETS—SHEET 2.

Witnesses:
Oliver M. Kappler
Horace D. Gay

Inventor
John H. Hertner
by Fay and Oberlin
Attorneys

UNITED STATES PATENT OFFICE.

JOHN H. HERTNER, OF CLEVELAND, OHIO, ASSIGNOR TO THE BAKER R. & L. COMPANY, OF CLEVELAND, OHIO, A CORPORATION OF OHIO.

DRIVING MECHANISM FOR AUTOMOBILES.

1,173,350.  Specification of Letters Patent.  Patented Feb. 29, 1916.

Application filed March 20, 1913. Serial No. 755,627.

*To all whom it may concern:*

Be it known that I, JOHN H. HERTNER, a citizen of the United States, and a resident of Cleveland, county of Cuyahoga, and State of Ohio, have invented a new and useful Improvement in Driving Mechanism for Automobiles, of which the following is a specification, the principle of the invention being herein explained and the best mode in which I have contemplated applying that principle, so as to distinguish it from other inventions.

The present invention, relating as indicated to driving mechanism for automobiles, has more particular regard to the provision of a worm gear drive for the differential or compensating gear in the rear axle housing which drives the respective rear axle sections. In the attempt to utilize the worm gear type of drive in the connection just indicated, no little difficulty has been experienced; for, on account of the trying nature of the service to which such gears are put in an automobile, it is essential that they be as nearly perfect both in their surface and adjustment, as possible, and practically the only way in which to finish such gears is to run them in under conditions where their working can be carefully observed.

The object of the present invention, accordingly, is to provide a construction of mounting for such worm gear drive which will permit of the convenient testing out of the latter on the block, and one which will make it possible, after the gears have been put into perfect running order and adjustment, to assemble the structure as an entirety in the rear axle structure without disturbing such adjustment.

To the accomplishment of these and related ends, the invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
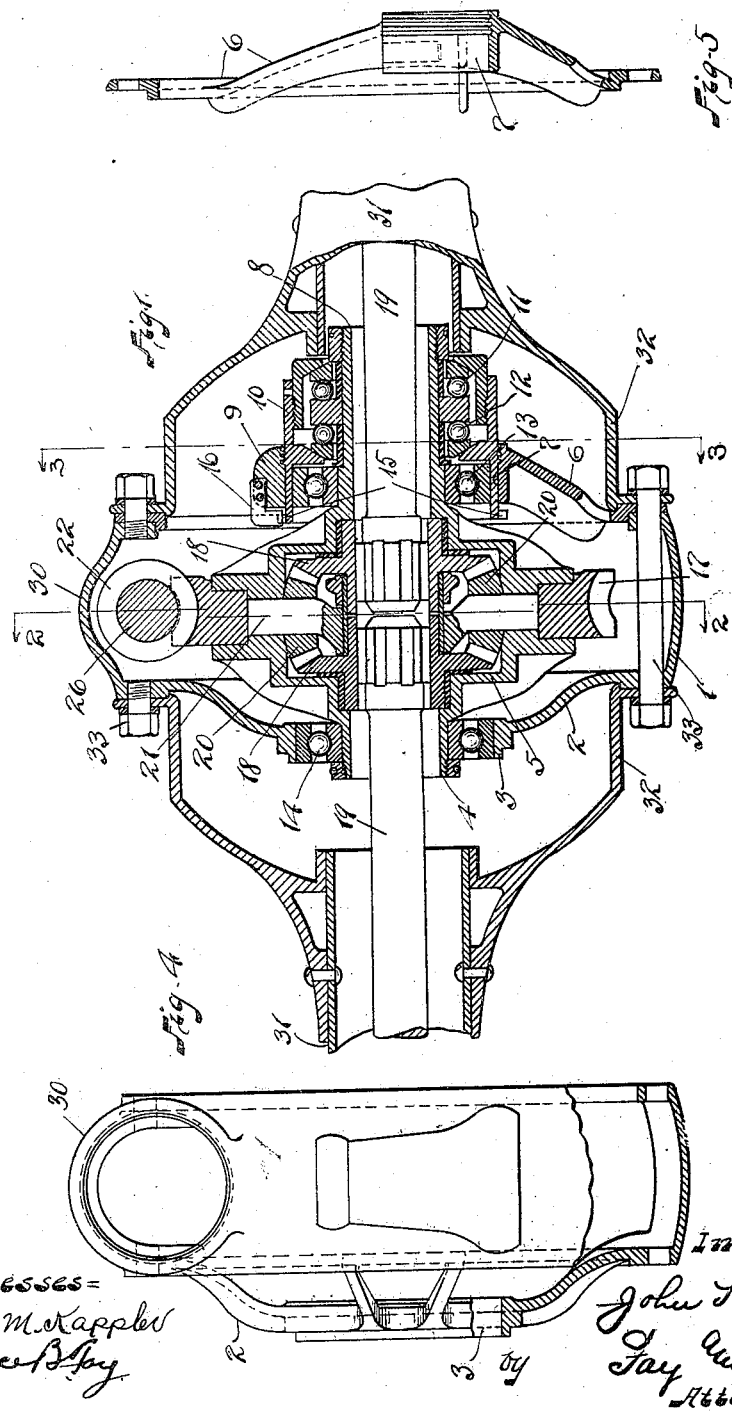
Figure 2:
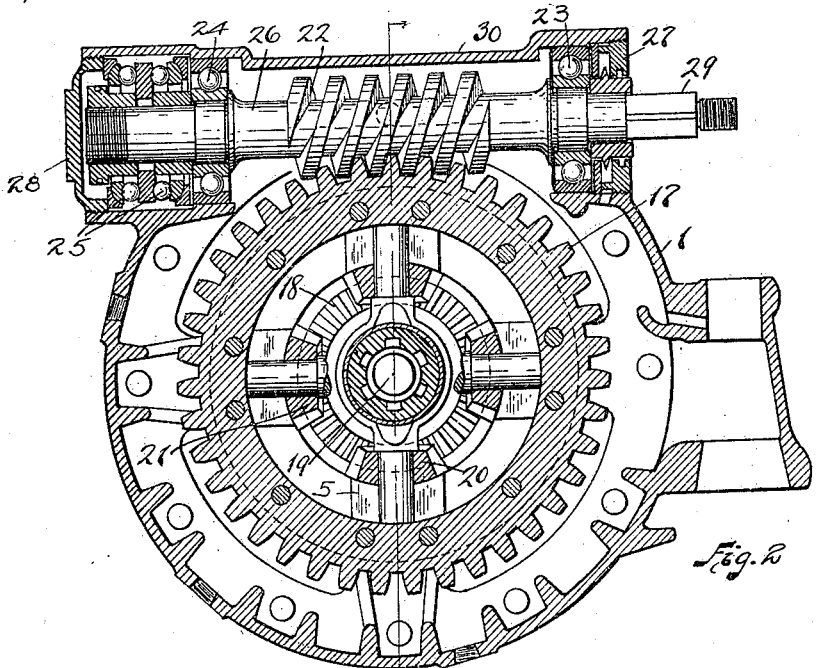
Figure 3:
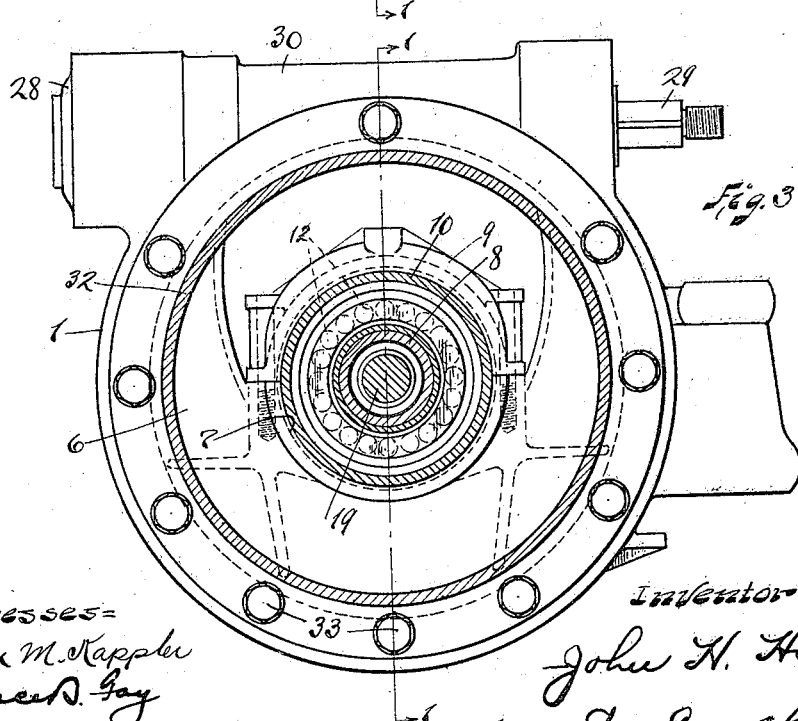

In said annexed drawings:—Figure 1 is a vertical longitudinal section through a rear axle embodying my present improvements; Fig. 2 is a vertical transverse section of such rear axle, taken on the plane indicated by the line 2—2, Fig. 1; Fig. 3 is a similar transverse section taken on the plane indicated by the line 3—3, Fig. 1; Fig. 4 is a broken elevational view of one member of the gear support forming a feature of the present invention; while Fig. 5 is a similar view of a complementary member.

The central feature of the rear axle structure, as illustrated in Fig. 1, is the support whereby the driving worm and the differential mechanism are both carried. This support comprises in part a hollow cylindrical member or casing 1, illustrated by itself in Fig. 4, that is provided on one side with an integral spider 2, the center 3 of which supports an annular bearing for the reception of one of the hub-like ends 4 of the drum 5 that carries the differential mechanism, proper. The other side of the casing is adapted to be closed by a complementary spider-like member 6 shown by itself in Fig. 5 which is provided at the center with a semi-annular bearing support 7 adapted to aline with the bearing 4 in the main member 1 of the casing when the two members or parts of said casing are bolted together.

The bearing thus provided serves to support the other hub 8 of the differential drum 5, such hub 8 being longer than hub 4, for a purpose presently to be described. The remaining half of the bearing for this hub 8 of the differential drum is provided by a cap 9, as shown in Fig. 3. The bearing thus provided is threaded in its outer portion, (see Figs. 1 and 5), to receive a sleeve 10, which carries the inner races for ball bearings, 11, 12 and 13, three in number, two of said bearings, viz. 11 and 12 being thrust bearings to take up the endwise thrust of the differential housing, while the other bearing carried in said sleeve 10, as well as the bearing 14 carried at the center 3 by the other member 1 of the housing, are plain rotatable, that is, radial, ball bearings. Such last-named bearing 14 is endwise slidable in the center 3 of member 1, so that by rotating the sleeve 10 the threaded engagement thereof with the bearing 7 in member 6 will serve to longitudinally adjust the entire differential casing. The sleeve is provided with a toothed flange 15 at its inner end with which a dog 16 is adapted to coöperate, so as to lock said sleeve in adjusted position.

The construction of the differential mechanism, proper, is of no particular interest in the present connection, except to note that the large gear 17 carried by the differential housing 5 is a worm gear instead of the usual bevel gear. The differential gears 18, proper, are mounted in the housing 5 in the usual fashion and receive the inner ends of the shaft-sections 19 which are connected at their outer ends with the wheels (not shown), as will be readily understood. Said gears 18 are driven by pinions 20 carried by a four arm spider 21, the detailed construction of which is preferably that shown in U. S. Letters Patent No. 1,029,793, dated June 18, 1912.

The worm 22 for driving the gear 17 on the differential drum 5 is journaled in the upper portion 30 of the supporting casing member 1, this portion of said casing member being formed as shown in Figs. 2 and 3, in order to provide the necessary space for the reception of the worm and its bearings. The latter comprise ordinary ball bearings 23 and 24, at each end, and a double thrust bearing 25, at the outer end of the worm spindle 26. Adjustment of the worm, when necessary, is effected entirely from such outer end, the outer race of the bearing 23 at the inner end being simply slidably held in the seat provided in the housing. The ends of the latter are closed by caps 27 and 28, respectively, which prevent the entrance of dust into the casing and the escape of lubricant therefrom. The inner end 29 of the worm spindle 26, which projects through the corresponding cap 27, is squared and threaded for connection with the driving or propelling shaft (not shown) as need not be explained in detail.

The structure thus far described, with the exception of the shaft-sections 19, the inner ends of which are removably held in the hubs of the differential gears 18, is an inclusive structure and may be assembled as a unit, quite independently of the remainder of the rear-axle housing. Such housing otherwise comprises two tubes 31 with their inner ends 32 enlarged and flanged to fit against the corresponding sides of the casing which supports the differential mechanism and worm drive, bolts 33 securing the tubes and casing solidly together. The same bolts are adapted to serve this purpose and to unite the two members 1 and 6 comprising said casing.

By reason of the self-contained character of the driving and differential mechanism, it will be seen that such mechanism may be completely assembled, adjusted and tested apart from the rest of the axle and car. Indeed it may be set upon the block and actually run in order not merely to test the connections of its gears and the accuracy of their adjustment, but also to "work in" the gears, which is highly important in the case of worm gears, if they are to give satisfactory service. When such mechanism is finally put in proper running condition, it may be incorporated in the axle structure without disturbing the adjustment in any way. Such assembly is quite simplified, indeed, involving merely the bolting of the tubes 31 onto the casing which supports the mechanism in question.

It will be understood that the general mode of assembling the gear is not dependent on the preferred arrangement of the radial and thrust bearings for the differential drum. In other words, instead of using double thrust bearings 11 and 12, both located at one end of the drum, one such thrust bearing could be located at the other end of said drum with the radial bearing 14. This modification is so simple as not to require separate illustration. In such event, it would be necessary, of course, to provide an adjustable sleeve, or carrier, for the bearings at this end of the drum, the same as at the first-mentioned end, and adjustment would involve the shifting of both of said sleeves.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the character described, the combination of a casing made up of a hollow substantially cylindrical member formed centrally on one side with an annular bearing support, and a separable complementary member closing the other side of said first member and formed with an alined bearing support; a differential drum having oppositely projecting hubs supported in said bearings, respectively; a worm gear carried by said drum; and a worm for driving said gear, journaled in said first casing-member transversely of the axis of said drum.

2. In mechanism of the character described, the combination of a casing made up of a hollow substantially cylindrical member formed centrally on one side with an annular bearing support, and a separable complementary member closing the other side of said first member and formed with an alined bearing support; radial bearings carried in each of said supports and a thrust bearing carried in the support in said separable member; a differential drum having oppositely projecting hubs supported in said radial bearings, respectively, one such hub being also held in said thrust bearing; a worm gear carried by said drum; and a worm for driving said gear, journaled in said first casing-member transversely of the axis of said drum.

3. In mechanism of the character described, the combination of a casing made up of a hollow substantially cylindrical member formed centrally on one side with an annular bearing support, and a separable complementary member closing the other side of said first member and formed with an alined bearing support; radial bearings carried in each of said supports and a thrust bearing carried in the support in said separable member; means adapted to axially adjust said thrust bearing; a differential drum having oppositely projecting hubs supported in said radial bearings, respectively, one such hub being also held in said thrust bearing; a worm gear carried by said drum; and a worm for driving said gear, journaled in said first casing-member transversely of the axis of said drum.

4. In mechanism of the character described, the combination of a casing made up of a substantially cylindrical member formed centrally on one side with an annular bearing support, and a complementary member closing the other side of said first member and formed with an alined bearing support; a sleeve longitudinally adjustably secured in such last-named bearing support; a differential drum having oppositely projecting hubs, one such hub being slidably journaled in the central bearing support of said first casing-member, the other such hub being non-slidably journaled in said sleeve; a worm gear carried by said drum; and a worm for driving said gear, journaled in said first casing-member transversely of the axis of said drum.

5. In mechanism of the character described, the combination of a casing made up of a substantially cylindrical member formed centrally on one side with an annular bearing support, and a complementary member closing the other side of said first member and formed with a semi-annular bearing support alined with such first-named support, such last-named support being internally threaded; a cap completing such last-named bearing support; a sleeve secured in and having threaded engagement with said last-named support; a differential drum having oppositely projecting hubs, one such hub being slidably journaled in the central bearing support of said first casing-member, the other such hub being non-slidably journaled in said sleeve; a worm gear carried by said drum; and a worm for driving said gear, journaled in said first casing-member transversely of the axis of said drum.

6. In mechanism of the character described, the combination of two oppositely extending axle tubes having enlarged inner ends; a substantially cylindrical casing interposed between and having its opposite sides secured to said tube ends, respectively so as to form therewith a complete axle housing; a differential drum directly mounted in and wholly supported by said casing; a worm gear carried by said drum; and a worm for driving said gear, journaled in said casing transversely of the axis of said drum.

7. In mechanism of the character described, the combination of two oppositely extending axle tubes having enlarged inner ends; a substantially cylindrical casing interposed between and having its opposite sides secured to said tube ends, respectively so as to form therewith a complete axle housing; axially alined radial and thrust bearings carried by said casing; a differential drum journaled in said bearings so as to be wholly supported by said casing; a worm gear carried by said drum; and a worm for driving said gear, journaled in said casing transversely of the axis of said drum.

8. In mechanism of the character described, the combination of two oppositely extending axle tubes having enlarged inner ends; a casing secured between said tube ends so as to form therewith an axle housing, said casing being made up of a hollow substantially cylindrical member formed centrally on one side with an annular bearing support, and a separable complementary member closing the other side of said first member and formed with an alined bearing support; a differential drum having oppositely projecting hubs supported in said bearings, respectively; a worm gear carried by said drum; and a worm for driving said gear, journaled in said first casing-member transversely of the axis of said drum.

9. In mechanism of the character described, the combination of two oppositely extending axle tubes, having enlarged inner ends; a casing secured between said tube ends so as to form therewith an axle housing, said casing being made up of a hollow substantially cylindrical member formed centrally on one side with an annular bearing support, and a separable complementary member closing the other side of said first member and formed with an alined bearing support, said complementary member being clamped between said first member and the inner end of the adjacent axle tube; a differential drum having oppositely projecting hubs supported in said bearings, respectively; a worm gear carried by said drum; and a worm for driving said gear, journaled in said first casing-member transversely of the axis of said drum.

10. In mechanism of the character described, the combination of two oppositely extending axle tubes having enlarged inner ends; a substantially cylindrical casing interposed between and having its opposite side secured to said tube ends, respectively so as to form therewith a complete axle housing; a differential drum directly mounted in and wholly supported by said casing; means carried by said casing adapted to axially adjust the position of said drum; a worm gear carried by said drum; and a worm for driving said gear, journaled in said casing transversely of the axis of said drum.

11. In mechanism of the character described, the combination of two oppositely extending axle tubes having enlarged inner ends; a substantially cylindrical casing interposed between and having its opposite sides secured to said tube ends, respectively so as to form therewith a complete axle housing; axially alined radial and thrust bearings carried by said casing; a differential drum journaled in said bearings so as to be wholly supported by said casing; means adapted to adjust the position of said thrust bearings to correspondingly axially adjust said drum; a worm gear carried by said drum; and a worm for driving said gear, journaled in said casing transversely of the axis of said drum.

12. In mechanism of the character described, the combination of two oppositely extending axle tubes having enlarged inner ends; a casing secured between said tube ends so as to form therewith an axle housing, said casing being made up of a substantially cylindrical member formed centrally on one side with an annular bearing support, and a complementary member closing the other side of said first member and formed with an alined bearing support; a differential drum having oppositely projecting hubs, one such hub being slidably journaled in the central bearing support of said first casing-member, the other such hub beinging non-slidably journaled in such alined bearing support; and a worm for driving said gear, journaled in said first casing-member transversely of the axis of said drum.

13. In mechanism of the character described, the combination of two oppositely extending axle tubes having enlarged inner ends; a casing secured between said tube ends so as to form therewith an axle housing, said casing being made up of a substantially cylindrical member formed centrally on one side with an annular bearing support, and a complementary member closing the other side of said first member and formed with a semi-annular bearing support alined with such first-named support, such last-named support being internally threaded; a cap completing such last-named bearing support; a sleeve secured in and having threaded engagement with said last-named support; a differential drum having oppositely projecting hubs, one such hub being slidably journaled in the central bearing support of said first casing-member, the other such hub being non-slidably journaled in said sleeve; a worm gear carried by said drum; and a worm for driving said gear, journaled in said first casing-member transversely of the axis of said drum.

Signed by me this 15" day of March, 1913.

JOHN H. HERTNER.

Attested by—
H. B. Fay,
Jno. F. Oberlin.